United States Patent [19]

Cohen

[11] Patent Number: 5,570,925
[45] Date of Patent: Nov. 5, 1996

[54] PINCH RELIEF STRUCTURE FOR CHILDREN'S RIDE-ON VEHICLE

[75] Inventor: Samuel L. Cohen, Fort Wayne, Ind.

[73] Assignees: Mattel, Inc.; Mattel Europa B.V., both of El Segundo, Calif.

[21] Appl. No.: 498,674

[22] Filed: Jul. 3, 1995

[51] Int. Cl.⁶ .................................................. B60R 5/02
[52] U.S. Cl. ........................ 296/177; 16/362; 16/364; 49/257; 180/69.21; 446/93; 446/471
[58] Field of Search ................. 296/177, 76; 180/69.21; 16/362, 363, 364; 49/254, 257; 446/487, 471, 470, 94, 93

[56] References Cited

U.S. PATENT DOCUMENTS

| | | | |
|---|---|---|---|
| 2,460,349 | 2/1949 | Hessler | 280/153 |
| 2,548,492 | 4/1951 | Rivard et al. | 180/69 |
| 2,794,208 | 6/1957 | Scroggins | 16/171 |
| 3,225,856 | 12/1965 | Caramanna | 180/69.21 |
| 3,225,857 | 12/1965 | De Haan et al. | 180/69 |
| 3,767,001 | 10/1973 | Chupick | 180/69 C |
| 4,125,170 | 11/1978 | Botz | 180/69 C |
| 4,173,095 | 11/1979 | Pauly et al. | 446/470 |
| 4,572,312 | 2/1986 | France et al. | 180/69.21 |
| 5,136,752 | 8/1992 | Bening et al. | 16/287 |

*Primary Examiner*—David M. Mitchell
*Assistant Examiner*—Kia M. Robinson
*Attorney, Agent, or Firm*—Kolisch, Hartwell, Dickinson, McCormack & Heuser

[57] ABSTRACT

A children's riding vehicle includes a compartment-enclosing member which may be pivotably opened and closed, and pinch relief structure thereon for preventing a child from pinching a finger when the enclosing member is closed. The structure includes an arm joined to the enclosing member adjacent an edge thereof so that it is movable therewith when the enclosing member is opened and closed. A slot in the vehicle receives the arm and permits it to move when the enclosing member is opened and closed, and further allows the arm and the enclosing member to be selectively moved, together as a unit and relative to the vehicle, for defining a space between the edge of the enclosing member to which the arm is joined and the vehicle, for preventing a child from pinching a finger when the member is closed.

7 Claims, 2 Drawing Sheets

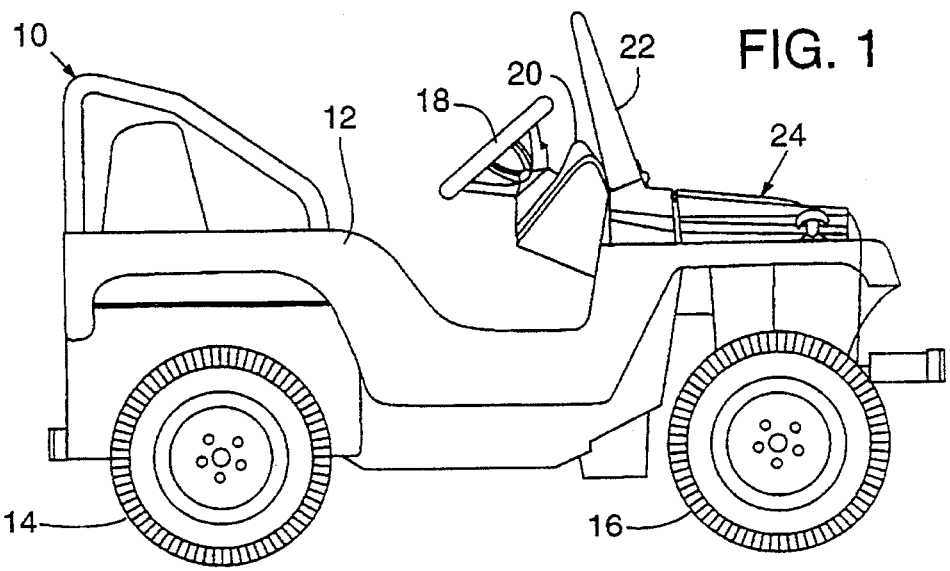
FIG. 1
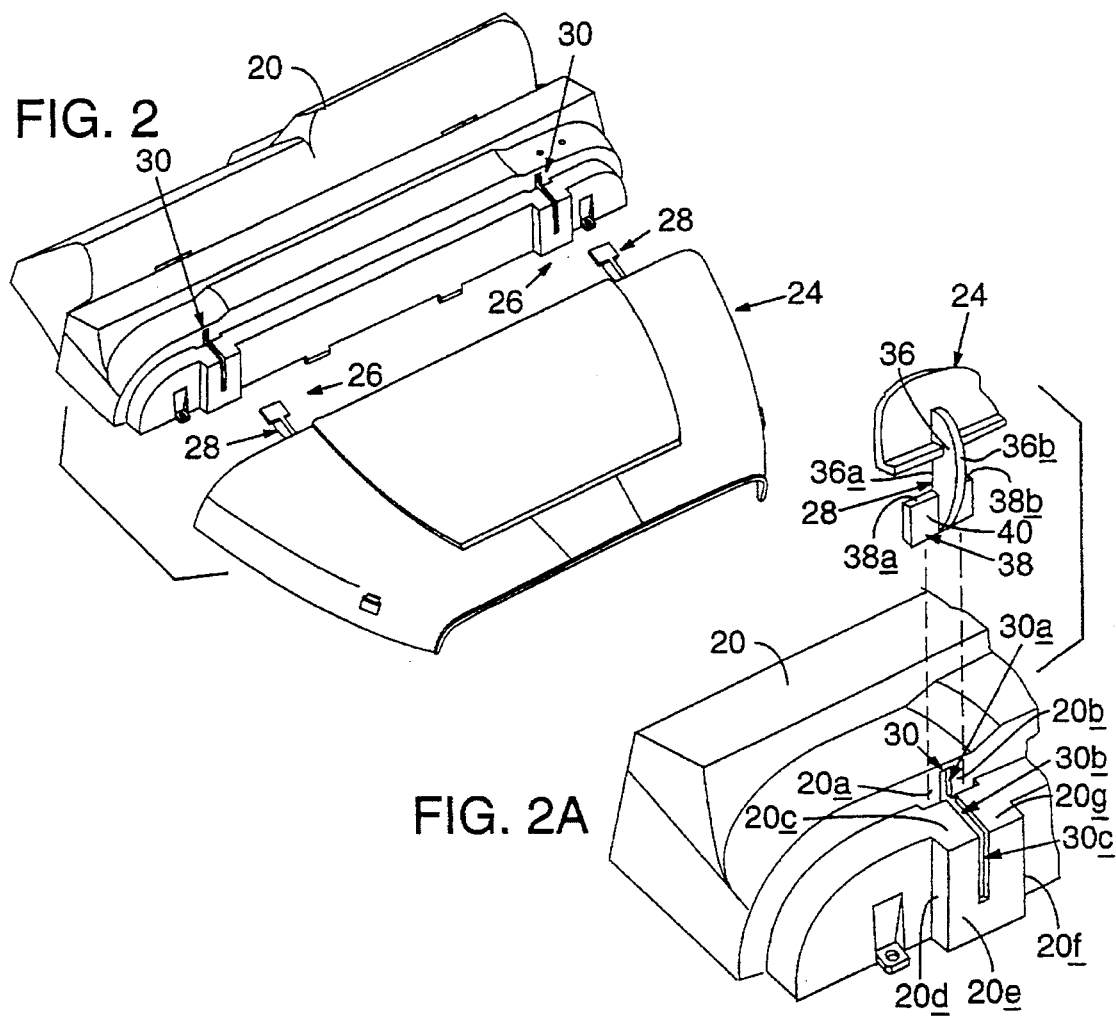
FIG. 2
FIG. 2A

PINCH RELIEF STRUCTURE FOR CHILDREN'S RIDE-ON VEHICLE

BACKGROUND AND SUMMARY OF THE INVENTION

This invention relates generally to children's ride-on vehicles, and more particularly it concerns pinch relief structure on the vehicle, for use in conjunction with a compartment-enclosing member such as a hood, trunk, or door, for preventing a child from pinching a finger when the member is closed.

Children's ride-on vehicles come in many shapes and sizes. Often times, such vehicles are modelled after real-life vehicles driven by adults. One such children's vehicle is the JEEP™ manufactured by Mattel's Power Wheels. One of the features of such vehicles, and one which is especially appealing to children, are the real-life moving parts which are designed to look and function like the counterparts on adult-driven vehicles. Such features include pivotably-attached compartment-enclosing members, e.g., hoods, trunks, and doors, which impart a realism to such children's ride-on vehicles and greatly enhance a child's enjoyment of the toy. For example, a child may pretend to be "working under the hood" by simply pivoting the hood to an open position and assuming a working position.

It is usually not a problem for safety-conscious adults to remember to extract their hands and/or fingers from the space in real-life vehicles which exists between the edge of an open enclosing member and the vehicle before closing the member. For children however, such may not always be the case. Because children are excitable and easily distracted when playing, they may not always remember to remove a hand or finger from the space between the edge of an enclosing member and the riding vehicle before the member is closed.

A need exists for a pinch relief device which may be incorporated into the design of children's ride-on vehicles, and particularly in conjunction with compartment-enclosing members thereon, to prevent a child from pinching a hand or finger when such compartment is closed.

With the above problems in mind, is a general object of the invention to provide a children's riding vehicle with pinch relief structure for preventing a child from pinching a hand or finger when a compartment-enclosing member is moved from an opened position to a closed position.

It is another object of the invention to provide pinch relief structure on a compartment-enclosing member which is an integral part of the enclosing member.

It is yet another object of the invention to provide a vehicle with pivotable compartment-enclosing members having pinch relief structure thereon, such structure being formed during the formation of the enclosing member.

It is a further object of the invention to provide a compartment-enclosing member with pinch relief structure on a children's riding vehicle which is durable enough to withstand the oftentimes destructive way a child treats a toy.

The invention achieves these and other objects in the form of a children's riding vehicle having a compartment-enclosing member, e.g., a hood, door or the like, which includes pinch relief structure for preventing a child from pinching a finger when the enclosing member is closed. The structure includes an arm joined to the member adjacent an edge thereof being movable therewith when the member is opened and closed. A slot in the vehicle receives the arm and permits it to move, as a unit with the enclosing member, when the enclosing member is opened and closed. Such movement within the slot selectively defines a space between the edge of the enclosing member adjacent which the arm is joined and the vehicle, such space for preventing a child from pinching a finger when the member is closed.

These and other advantages and features of the invention will become more fully apparent when the detailed description below is read with reference to the accompanying drawings.

BRIEF DESCRIPTION OF THE DRAWINGS

FIG. 1 shows a side elevation of a children's riding vehicle constructed according to the preferred embodiment of the present invention.

FIG. 2 is an isometric, exploded view of an enclosing member constructed according to the preferred embodiment of the present invention and intended for use on a vehicle, such as one shown in FIG. 1.

FIG. 2A is an enlarged view of a portion of the dash of the vehicle of FIG. 1, showing pinch relief structure constructed according to the preferred embodiment of the present invention.

DETAILED DESCRIPTION OF THE PREFERRED EMBODIMENT

Figure 3:
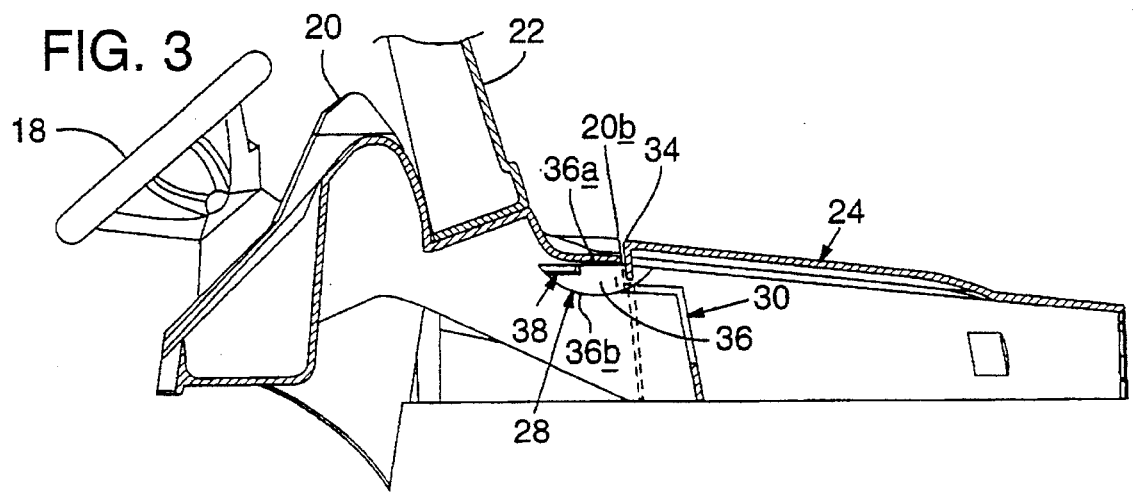
FIG. 3 is a partial view of the vehicle of FIG. 1, showing the dash and the enclosing member of FIG. 2, with a portion broken away to show detail, and wherein the enclosing member is in a closed position.

FIG. 1 shows a children's riding vehicle generally at 10, which includes a compartment-enclosing member with pinch relief structure according to a preferred embodiment of the present invention.

Vehicle 10 includes a body 12 preferably constructed from molded, durable plastic, having plural wheels rotatably mounted thereon, two of which are shown at 14, 16. A steering wheel 18 is mounted adjacent a dash 20 which includes thereon a windshield 22. A compartment-enclosing member with pinch relief structure constructed according to the preferred embodiment of the present invention is shown generally at 24 in the form of a hood which is pivotally mounted on body 12. It will be understood that compartment-enclosing member means any structure on a children's riding vehicle which is pivotally mounted thereon and movable between an opened and a closed position for allowing access to a compartment. A compartment may include a passenger compartment, a trunk compartment, a glove box compartment, an underseat compartment, or a truck bed compartment, to name just a few. Accordingly, the compartment-enclosing members associated with each of the compartments named above would include a door (for access to the passenger compartment), a trunk lid (for access to the trunk), a glove box door (for access to the glove box), a seat (for access to the underseat compartment), and a tailgate (for access to the truck bed).

FIG. 2 shows dash 20 and hood 24 in more detail where like elements have been similarly labelled, and where pinch relief structure according to the preferred embodiment may be seen generally at 26 in the form of two arms 28 joined to the rear hood edge, and two slots 30 formed in dash 20 for receiving a corresponding arm.

Arms 28 are preferably integral parts of the hood having been formed at the same time and with the same mold as the hood during the injection molding process which formed the hood. It is possible however for arms 28 to be formed separately and then bonded to the hood in any suitable fashion.

Slots 30 each define what appears to be a T-shaped slot in the front of dash 20, one of which is shown in greater detail in FIG. 2A. There, it may be seen that slot 30 is formed by plural sub-slots which, for purposes of description, include a first sub-slot, a second sub-slot, and a third sub-slot.

The first sub-slot is shown at 30a and appears between two generally vertically-oriented wall portions 20a, 20b, in dash 20.

The second sub-slot is represented by two slots, slot 30b which appears between wall portions 20c, 20g, and slot 30c which is generally centrally-disposed in wall portion 20e. Wall portions 20c, 20g, and 20e define part of a generally-rectangular support block formed in the front of dash 20 which also includes wall portions 20d, 20f as well.

The third sub-slot is not specifically labelled, but may be seen at the rear edge of wall portions 20c, 20g in the form of two rectangular recesses, one on either side of slot 30b which together traverse the first and second sub-slots and define the cross leg or cross member on the T-shaped slot mentioned above.

FIG. 2A also shows the preferred embodiment of arm 28 in the form of a generally flat, segment member 36 which includes a first end joined to the underside of hood 24 and a second end spaced from the first end which is insertable into slot 30 as shown and described below. Member 36 includes a generally flat upper surface 36a, and a generally arcuate lower surface 36b. It will be understood, however, that any suitably-shaped arm which is joined or connected to hood 24 which allows the hood and arm to move as a unit and behave as described below will suffice.

Figure 4:
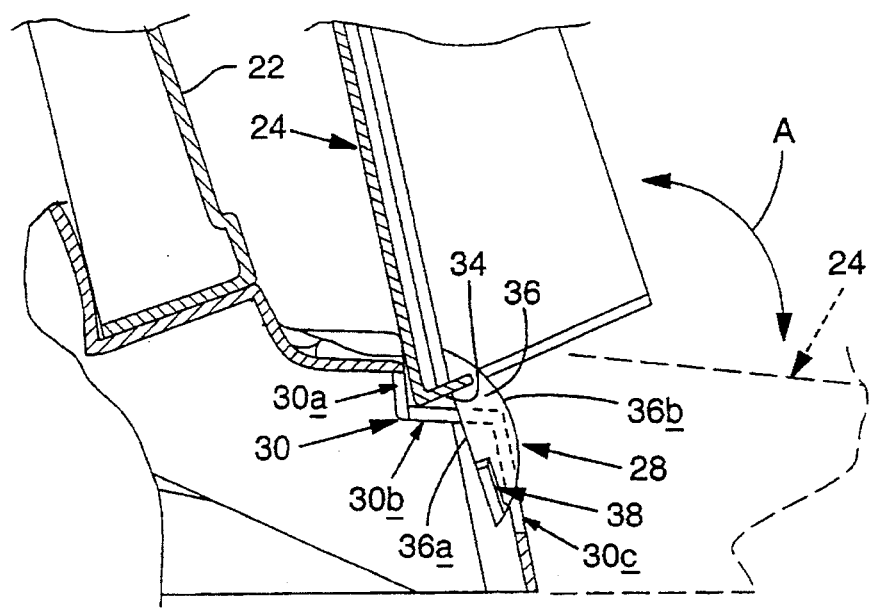
FIG. 4 is a view, similar to the one shown in FIG. 3, only the enclosing member is shown in the open position.
Figure 5:
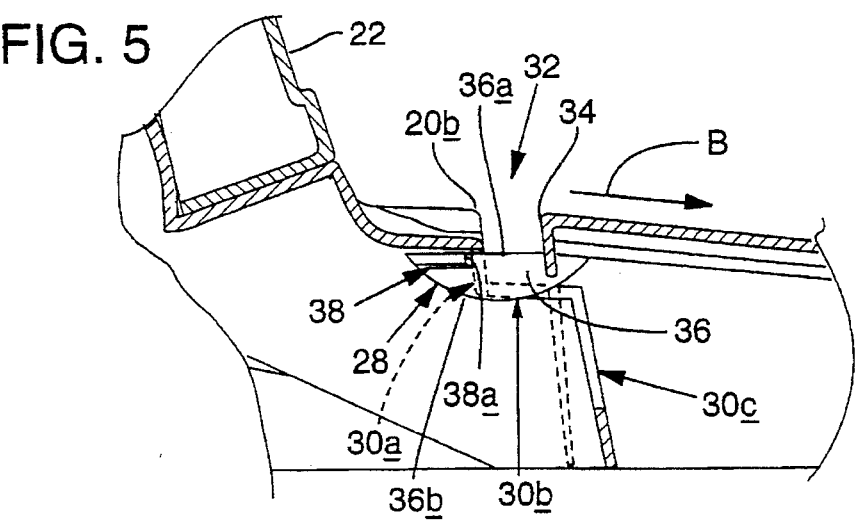
FIG. 5 is a view similar to the one shown in FIG. 3, only the enclosing member has been moved a short distance to define a space between the dash and the hood.

As shown in FIG. 3, the right-most end or first end of arm 28 is joined to the underside of hood 24 adjacent rear hood edge 34 and permits the arm to move as a unit with the hood when the hood is moved or pivoted in a first direction, indicated by arrow A in FIG. 4, between the opened position and the closed position. Arrow A defines a bi-directionally-arcuate path between the opened and closed position. Arm 28 includes, adjacent the left-most end or second end (and as viewed in FIGS. 3 and 5), a stop 38 for engaging vehicle 10, and more specifically wall portions 20a, 20b (FIG. 2A) when hood 24 is moved in a second direction indicated by arrow B shown in FIG. 5, which is different from the direction indicated by A, being generally straight and directed away from slot 30. Movement of the hood along arrow B defines a space 32 which prevents a child from pinching a finger when the hood is closed.

FIG. 2A shows stop 38 in greater detail where a pair of ledges 38a, 38b may be seen on either side of upper surface 36a. Ledges 38a, 38b engage vehicle 10, and more specifically wall portions 20a, 20b respectively, adjacent slot 30a for halting the movement of hood 24 when it is moved in the direction of arrow B. In the preferred embodiment, each of the ledges defines a side, or a portion of a side of a multi-sided structure 40 which has four sides and is generally square-shaped or rectangularly-shaped.

OPERATION

Pinch relief structure 26 provides an easy-to-manufacture component which, when used in conjunction with children's riding vehicles, prevents a child from pinching a finger when a compartment-enclosing member, e.g., a hood, door, trunk, tail gate etc., is moved from an opened position to a closed position. Relief structure 26 is preferably injection molded from plastic, using the same mold from which the hood is formed. This one-piece construction holds many advantages from both the manufacturing standpoint and the end-use standpoint.

First, from the manufacturing standpoint, a great deal of time is saved because the hood and relief structure are fabricated or formed together and at the same time. If the hood and relief structure were to be separately formed, each would have to be connected together which would require additional time. From an assembly standpoint, the hood together with the integrally-formed, one-piece arms enable a simple and quick assembly in which the hood is simply oriented generally vertically so that each arm is directed as shown in FIG. 2A., and then inserted into slot 30 so that the each ledge 38a, 38b underlies the bottom of wall portions 20a, 20b respectively. Then, the hood is simply moved to the closed position (FIG. 3) which rotates stop 38 to a position behind wall portions 20a, 20b as shown.

Second, from the end-use standpoint, less moving parts mean less risk of breakage. Further, the one-piece construction greatly reduces the chances that a part will stick and not work properly when the hood is called upon to shift and prevent a child from pinching a finger. Many more advantages will be understood by those of skill in the art.

Describing the operation of the hood and pinch relief structure in somewhat more detail, and referring collectively to FIGS. 2A through 5, hood 24 is movable from a closed position shown in FIG. 3, upwardly along an arcuate path indicated by arrow A in FIG. 4, to an opened position such as would be the case if a child wished to pretend to perform maintenance on a make-believe engine or access a storage compartment. When the hood is moved from the closed position to the open position as described, sub-slots 30b, 30c permit arm 28 to move with the hood as a unit therethrough, as shown in FIG. 4, along the hood's arcuate path. In the open position shown in FIG. 4, hood edge 34 may be seen to rest on the support block defined by wall portions 20c through 20g discussed above in connection with FIG. 2A. FIG. 4 also shows stop 38 in a position adjacent sub-slot 30c where it engages wall portion 20e (FIG. 2A) on either side of slot 30c to restrict the hood's further movement rearwardly.

After a child is finished playing under the hood or accessing the storage compartment, the child may wish to close the hood and resume normal vehicle operation. In order to do so, the child would naturally close the hood, returning it along the arcuate path indicated by arrow A. Without the pinch relief structure of the present invention, closing the hood would return it to the position shown in FIG. 3, where rear edge 34 of hood 24 may be seen to lie flush against wall portion 20b. It will be appreciated that in such a position there is little or no room for a child's finger in the space between hood edge 34 and wall portion 20b which would pinch a little finger were such to be inadvertently inserted therein.

The pinch relief structure described thus far, that is, slot 30 and arm 28 allow hood 24 to be selectively moved as a unit with arm 28 through slot 30 and in a direction generally away from the slot, for defining space 32 (FIG. 5) between dash 20 and hood edge 34 which prevents a child from pinching a finger when the hood is closed. In the preferred embodiment, the space has a width of around ⅝-inch, but it will be appreciated that any space which is suitable for preventing a child from pinching a finger or even a hand will do. Further, tolerances may change between the various compartment-enclosing members described above so that the width of the space must be adjusted. All of such variations or modifications are within the spirit and scope of the invention.

With respect to the selective movement of hood 24 and arm 28 away from slot 30, it will be appreciated that if a child's finger were to become inadvertently placed in space 32 during closure of the hood, the action of hood edge 34 abutting or engaging the child's finger would cause the hood to shift, and more specifically would cause arm 28 to be displaced through sub-slots 30a, 30b, and 30c as described above for defining space 32.

Briefly summarizing, a children's riding vehicle incorporating pinch relief structure has been described. The pinch relief structure is joined to a compartment-enclosing member, which in the preferred embodiment is a hood, and prevents a child from pinching a finger when the hood is moved from an opened position to a closed position. It does so by providing an arm, which is joined to the hood adjacent an edge thereof, and a slot in the vehicle for receiving the arm and allowing the same to move therein, as a unit with the hood, when the hood is moved between the opened and closed position. The arm, and hence the hood, are selectively movable in a direction generally away from the slot for defining a space between the hood edge adjacent which the arm is joined, and the vehicle's dash for preventing a little finger from being pinched when the hood is closed.

While the present invention has been shown and described with reference to the foregoing preferred and alternative embodiments, it is to be understood by those of skill in the art that other changes in form and detail may be made therein without departing from the spirit and scope of the invention as defined in the appended claims.

I claim:

1. In a children's riding vehicle of the type which includes a compartment-enclosing member which may be pivotably opened and closed for allowing access to a compartment on the vehicle, pinch relief structure for preventing a child from pinching a finger when the member is closed comprising:

an elongate arm with a free end and a fixed end joined to the member adjacent an edge thereof being movable therewith when the member is opened and closed and including an elongate axis;

a stop disposed on the arm proximal to the free end and including a ledge extending transverse to the elongate axis of the arm; and a slot in the vehicle for receiving therethrough the free end of the arm and the stop and permitting them to move pivotally within the slot when the enclosing member is opened and closed, the slot further allowing the arm and member to be selectively moved together as a unit, relative to the vehicle, in the direction of the elongate axis of the arm for a distance limited by engagement of the ledge with the vehicle for defining a space between the edge of the enclosing member adjacent which the arm is joined and the vehicle, such space for preventing a child from pinching a finger when the member is closed.

2. The structure of claim 1, wherein the slot has an elongate axis and includes a transverse subslot configured to allow the stop to pass therethrough when the member is positioned in the open position and moved away from the vehicle in a direction along the elongate axis of the arm.

3. The structure of claim 1, wherein the enclosing member is a hood and the arm is joined adjacent the rear edge thereof.

4. In a children's riding vehicle of the type which includes a compartment-enclosing member which is movable between an opened and closed position, pinch relief structure for preventing a child from pinching a finger when the enclosing member is closed comprising:

an elongate arm with a free end and a fixed end joined to the enclosing member for movement therewith and including an elongate axis, wherein the arm and the enclosing member are movable together in a first and second direction, which directions are different from each other;

a stop disposed on the arm proximal to the free end and including a ledge extending transverse to the elongate axis of the arm; and a slot in the vehicle for receiving therethrough the free end of the arm and the stop and allowing them to be moved along with the member in the first and second directions, wherein the first direction lies along a generally arcuate path between the opened and closed positions and the second direction is a motion directed generally along the elongate axis of the arm for a distance limited by the stop.

5. The structure of claim 4, wherein the enclosing member is a hood.

6. A children's riding vehicle comprising:

a body;

plural wheels rotatably mounted on the body;

a compartment-enclosing member pivotably mounted on the body and movable between an opened position and a closed position;

at least one elongate arm with a free end and a fixed end joined to the enclosing member;

a stop disposed on the arm proximal to the free end and including a ledge extending transverse to the elongate axis of the arm; and a slot in the body for receiving therethrough the free end of the arm and the stop and through which the arm moves when the member is opened and closed, the slot further allowing the member and the fixed end of the arm to be selectively moved as a unit in a direction generally away from the slot for a distance determined by the position of the ledge on the stop, when the member is closed, for defining a space between the vehicle and the member which prevents a child from pinching a finger when the member is closed.

7. The vehicle of claim 6, wherein the enclosing member is a hood.

* * * * *